July 19, 1960   A. J. SHMIDL   2,945,901
PRODUCTION OF POLYISOPROPYL BENZENE
Filed June 6, 1958
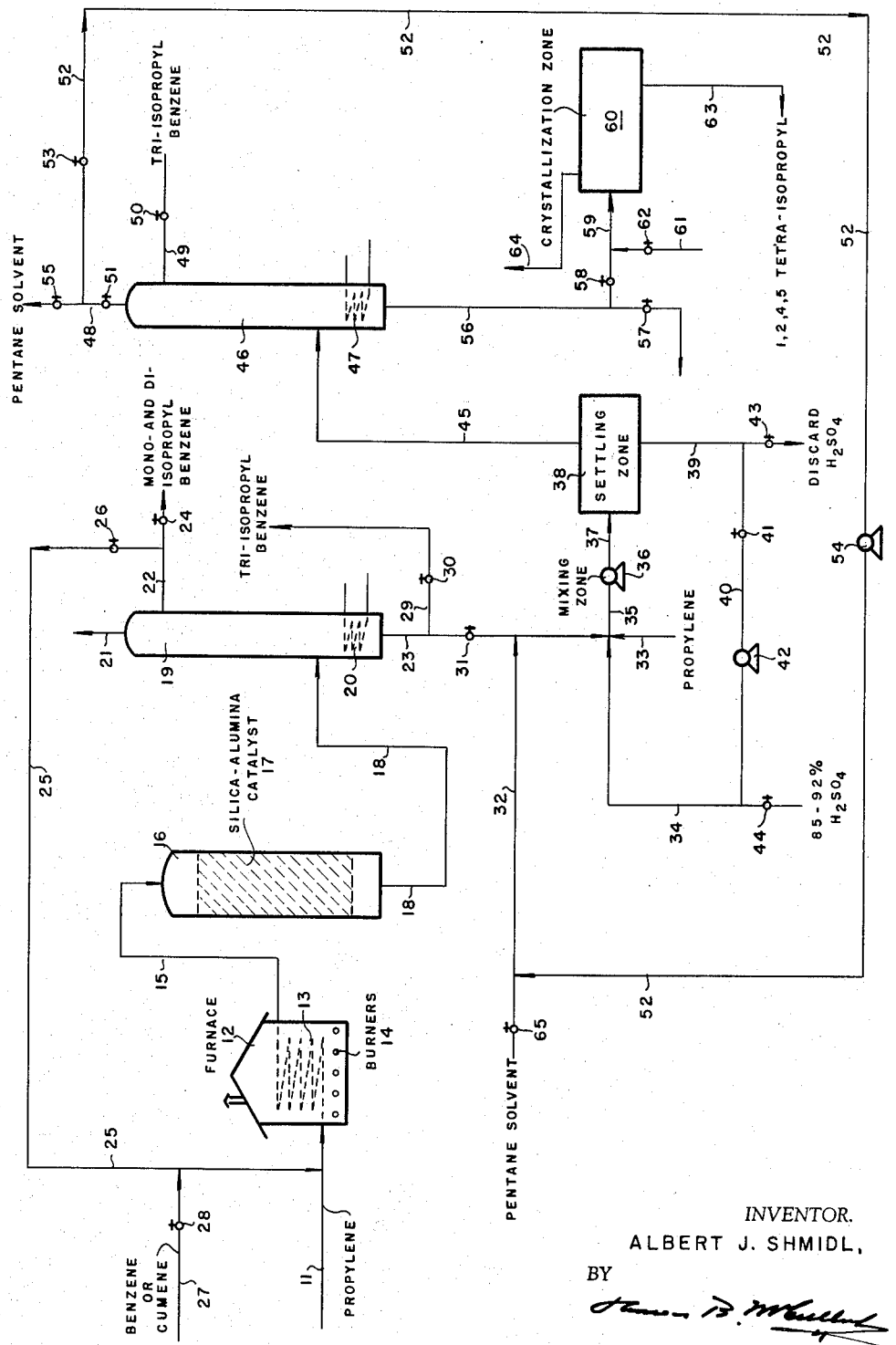
INVENTOR.
ALBERT J. SHMIDL,
BY
ATTORNEY.

United States Patent Office 2,945,901
Patented July 19, 1960

2,945,901

PRODUCTION OF POLYISOPROPYL BENZENE

Albert J. Shmidl, Crosby, Tex., assignor, by mesne assignments, to Esso Research and Engineering Company, Elizabeth, N.J., a corporation of Delaware Filed June 6, 1958, Ser. No. 740,280

9 Claims. (Cl. 260—671)

The present invention is directed to a method for producing polyalkylated benzene. More particularly, the invention is directed to a method for producing polyisopropyl benzene. In its most specific aspects, the invention is concerned with producing 1,3,5 tri-isopropyl benzene and 1,2,4,5 tetra-isopropyl benzene.

The present invention may be briefly described as a method for producing polyalkylated benzene by forming a reaction mixture of propylene and an aromatic hydrocarbon selected from the group consisting of benzene and isopropyl benzene and thereafter contacting the mixture with a silica-alumina catalyst at a temperature within the range from about 300° to about 450° F. for a sufficient length of time to form a product containing a substantial amount of 1,3,5 tri-isopropylene and thereafter recovering the product.

It is contemplated that the recovered product, tri-isopropylene, may be used as such but preferably is formed into a solution in a liquid saturated aliphatic hydrocarbon having a boiling point different from that of the tri-isopropylene and then subjected to alkylation with additional amounts of propylene. This latter alkylation with propylene causes the formation of the 1,2,4,5 tetraisopropylene and is conducted at a temperature within the range from about 60° to about 80° F. with a sulfuric acid catalyst having a strength within the range from about 85% to about 92% $H_2SO_4$. The product formed is a result of the second alkylation step. It is distilled to separate the solvent and unreacted tri-isopropyl benzene and to recover the tetra-isopropyl benzene which then may be subjected to crystallization to purify further the tetra-isopropyl benzene. The solvent and unreacted tri-isopropylene may be recycled to the second alkylation stage.

It is important that the feed stock be benzene or isopropyl benzene (cumene) since the normal propyl benzene does not react satisfactorily to form the tri-isopropyl benzene desired. Therefore, normal propyl benzene is not used as a feed stock.

The propylene and the benzene or cumene are used in amounts of about 2 molar volumes of propylene per molar volume of the benzene or cumene. Satisfactory alkylation to form the desired tri-isopropyl benzene is obtained with a ratio of propylene to benzene or cumene of about 2 to about 4 molar volumes.

The reaction may be represented by the equation:

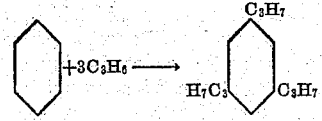

The mixture of propylene and benzene or cumene is contacted with the silica-alumina catalyst at the aforesaid temperatures for a time within the range from about 15 to about 60 minutes. Stating this otherwise, a space velocity in the range from about 0.5 v./v./hr. to about 4.0 v./v./hr. may be used.

The tri-isopropyl benzene formed as an intermediate reaction product has a freezing point of 5° F. and will not crystallize from the solvent. However, tetra-isopropyl benzene has a freezing point of 242° F. and will crystallize readily at alkylation temperatures of about 60° to about 80° F. and, therefore, in practicing the present invention it is important that the tri-isopropyl benzene be dissolved in a suitable solvent prior to further alkylation such that the tetra-isopropyl benzene will not crystallize at alkylation temperatures.

The solvents should be a liquid saturated aliphatic hydrocarbon having a boiling point different from that of the tri-isopropyl benzene and different from that of the tetra-isopropyl benzene to allow ready separation thereof. A suitable solvent is a paraffinic hydrocarbon having from 5 to 7 carbon atoms in the molecule. As a specific example, pentane has been used successfully. Other suitable solvents may also be used.

The tetra-isopropyl benzene formed in the second alkylation stage is readily separated from the unreacted tri-isopropyl benzene and the pentane solvent but may contain a small amount of tri-isopropyl benzene. Therefore, it is desirable in the practice of the present invention to crystallize the tetra-isopropyl benzene from solution and to achieve this end a solvent such as one of the nature described may be employed to crystallize the tetra-isopropyl benzene from the solution. To achieve this crystallization, the separated tetra-isopropyl benzene is put in solution in a solvent of the nature described and the temperature adjusted to a temperature in the range between about 80° F to about —40° F. to cause the tetra-isopropyl benzene to crystallize and to allow recovery of the separated crystals.

The amount of solvent added to the tri-isopropyl benzene may be in the range from about 1 to about 5.0 volumes of solvent per volume of tri-isopropyl benzene. This amount of solvent will maintain the tetra-isopropyl benzene product in solution. Likewise, the amount of solvent added to purify the tetra-isopropyl benzene may be in the range from about 1 to about 5.0 volumes per volume of tetra-isopropyl benzene.

It is important that a silica-alumina catalyst be employed in the first stage to cause the selective formation of tri-isopropyl benzene for ready separation from the mono- and di-isopropyl benzene which may be formed or from the mono-isopropyl benzene as unreacted feed when cumene is a feed stock. With respect to the sulfuric acid catalyst employed in the second stage operation, it is important that acids having the strength specified be employed since with higher strength acids considerable amounts of coke and sludgy material are formed whereas with lower strength acid very little, if any, alkylation proceeds.

The present invention will be further illustarted by reference to the drawing in which the single figure is a flow diagram of a preferred mode. Referring now to the drawing, numeral 11 designates a charge line by way of which propylene and benzene or cumene is introduced into a furnace 12 provided with a heating coil 13 and supplied with heat from gas burners 14. As a result of the feed mixture passing through the coil 13 the temperature is adjusted to a temperature in the range from about 300° to about 450° F., and the heated product at a pressure in the range from about 400 to about 500 p.s.i.g. is introduced by way of line 15 into a reaction zone 16 provided with a bed of silica-alumina catalyst 17. On passage of the heated feed stock through the bed 17 a product is formed containing substantial quantities of the particular tri-isopropylene desired. This product is withdrawn from zone 16 by line 18 and introduced thereby into a fractional distillation zone 19 illustrated as a single distillation tower provided with a heating means such as heating coil 20 but which may be a plurality of distillation towers. Zone 19 is suitably provided with internal vapor-liquid contacting means such as bell cap trays to insure intimate contact between vapor and liquids. Zone 19 is also provided with all auxiliary equipment found in the modern distillation tower such as condensing and cooling means, means for inducing reflux, and the like.

Zone 19 is operated under conditions to discharge by way of line 22 any light products which may have been formed in zone 16 and to discharge by way of line 22 mono- and di-isopropyl benzene while the desired porduct, tri-isopropyl benzene, is withdrawn from zone 19 by way of line 23. The mono- and di-isopropyl benzene may be withdrawn from the system by opening valve 24 in line 22 but preferably are recycled to line 11 through line 25 controlled by valve 26 which introduces the mono- and di-isopropylene into line 11 in admixture with the propylene. Line 27 controlled by valve 28 discharges into line 25 for introduction of fresh benzene or cumene into the system.

The tri-isopropylene in line 23 may be withdrawn as a product by way of line 29 controlled by valve 30 but preferably is introduced by way of line 23, by opening valve 31, into a second alkylation system or stage which will be described further hereinafter.

Since the tri-isopropyl benzene solidifies readily at atmospheric temperatures a solvent of the nature described is introduced into line 23 by line 32 to form a solution of the tri-isopropyl benzene. Into this solution there is introduced by way of line 33 a sufficient amount of propylene for alkylation with the tri-isopropyl benzene. The amount of propylene employed in the second alkylation stage may range from about 1 molar volume of propylene per molar volume of the tri-isopropyl benzene. Also introduced into the solution by way of line 34 is a sulfuric acid catalyst having a strength from about 85 to about 92% $H_2SO_4$. The solution of pentane and tri-isopropyl benzene to which the acid and propylene have been added is then discharged into line 35 through a mixing zone 36 which is illustrated as a centrifugal pump but which may be any mixing device such as an incorporator, a countercurrent mixing tower, a stirred agitator or any mixing apparatus which will cause intimate admixture among the solution, the propylene, and the acid catalyst.

The mixture of catalyst and solution is then discharged by way of line 37 into a settling zone 38 which is of sufficient capacity to provide a sufficient residence time to allow a separation between the alkylated product and the acid catalyst. A separation is thus made in zone 38 and the separated acid catalyst is withdrawn by line 39 and preferably is recycled at least in part by way of line 40 controlled by valve 41 and containing pump 42 to line 34 for recycling through zone 36.

From time to time it will be desirable to discard part of the acid in line 39 and this may be done by opening valve 43. When acid is discarded from line 39, as has been described, it will be desirable and necessary to add make-up acid of the proper strength and this may suitably be accomplished by opening valve 44 in line 34 connected to a source of acid of the required strength to maintain the 85 to 92% $H_2SO_4$ acid strength in the second alkylation stage.

The alkylated product is withdrawn from zone 38 by line 45 and introduced thereby into a second distillation zone 46 which is similar in all respects to zone 19 and is provided with a heating means such as a steam coil 47. Prior to introducing the alkylated product into zone 46, preferably it is subjected to a neutralization step to neutralize acid or esters with sodium hydroxide or preferably anhydrous ammonia. Zone 46 has all the auxiliary equipment mentioned with respect to zone 19.

Conditions are adjusted in zone 46 to separate pentane solvent and unreacted tri-isopropyl benzene from the tetra-isopropyl benzene. The pentane solvent may be taken off as a separate stream by way of line 48 and the tri-isopropyl benzene also may be withdrawn as a separate stream by way of line 49 controlled by valve 50. Preferably, however, the pentane solvent and tri-isopropyl benzene are withdrawn as a combined stream by way of line 48, valve 50 in line 49 being closed and valve 51 in line 48 being opened, connecting line 48 with recycle line 52 controlled by valve 53, allowing the pentane and tri-isopropyl benzene solution to be pumped by pump 54 to line 32 for admixing with the solution in line 23. It will be understood, of course, that valve 55 in line 48 will remain colsed during these operations. It is also to be understood that, rather than tri-isopropyl benzene being withdrawn by line 49, the solution of pentane and tri-isopropyl benzene may be withdrawn by line 49 with valve 51 remaining closed.

The substantially purified tetra-isopropyl benzene is discharged from zone 46 by line 56 and may be taken off as product by opening valve 57. Preferably, however, valve 57 is maintained closed and valve 58 in line 59 is opened, discharging the tetraisopropyl benzene which may contain some tri-isopropyl benzene into a crystallization zone 60 after admixture with solvent introduced by line 61 controlled by valve 62.

Temperature conditions are adjusted in zone 60 to cause precipitation of the tetra-isopropyl benzene as crystals from the solution and to allow discharge of the crystals from zone 60 by line 63 with the supernatant liquor being discharged by way of the line 64. While pentane is described as the solvent for the tetra-isopropyl benzene, isopropyl alcohol may be used. Sufficient solvent may be used to provide a saturated solution at 160° F. Then by lowering the temperature to within the range from about 80° to about 0° F., tetra-isopropyl benzene will crystallize and may be recovered in purity of 99% by centrifuging.

Since some of the pentane or other solvent may be lost in the operation, line 32 is provided with a valve 65 for introduction of make-up pentane solvent into the system.

From the foregoing description taken with the drawing, it will be seen that a new and improved method has been provided for forming polyalkylated benzene and, specifically, tri- and tetra-isopropyl benzene.

The present invention is of considerable importance and utility in that the particular benzenes formed in this operation are quite useful as solvents, the tri-isopropyl benzene being substantially odorless and, therefore, quite attractive for this use. The tri- and tetra-isopropyl benzenes are also useful for manufacture of chemicals.

The nature and objects of the present invention having been completely described and illustrated, what I wish to claim as new and useful and to secure by Letters Patent is:

1. A method for producing a polyalkylated benzene which comprises forming a reaction mixture of propylene and an aromatic hydrocarbon selected from the group consisting of benzene and isopropyl benzene in a ratio of propylene to aromatic hydrocarbon in the range from about 2 to about 4 molar volumes per volume, contacting said mixture with a silica-alumina catalyst at a temperature within the range from about 300° to about 450° F. for a sufficient length of time to form a product containing a substantial amount of 1,3,5 tri-isopropyl benzene, distilling said product to recover said tri-isopropyl benzene, forming a solution of said tri-isopropyl benzene in a liquid saturated aliphatic hydrocarbon having a boiling point different from that of the tri-isopropyl benzene, adding an alkylation amount of propylene at least 1 molar volume of propylene per molar volume of tri-isopropyl benzene to said solution, contacting the propylene-containing solution at a temperature within the range from about 60° to about 80° F. with a sulfuric acid catalyst having a strength within the range from about 85% to about 92% $H_2SO_4$ to form a product containing a substantial amount of 1,2,4,5 tetra-isopropyl benzene and recovering substantially purified 1,2,4,5 tetra-isopropyl benzene from said product.

2. A method for producing a polyalkylated benzene which comprises forming a reaction mixture of propylene and an aromatic hydrocarbon selected from the group consisting of benzene and isopropyl benzene in a ratio of propylene to aromatic hydrocarbon in the range from about 2 to about 4 molar volumes per volume, contacting said mixture with a silica-alumina catalyst at a temperature within the range from about 300° to about 450° F. for a sufficient length of time to form a product containing a substantial amount of 1,3,5 tri-isopropyl benzene, distilling said product to recover said tri-isopropyl benzene, forming a solution of said tri-isopropyl benzene in a saturated aliphatic hydrocarbon having 5 to 7 carbon atoms and having a boiling point different from that of the tri-isopropyl benzene, adding an alkylation amount of propylene at least 1 molar volume of propylene per molar volume of tri-isopropyl benzene to said solution, contacting the propylene-containing solution at a temperature within the range from about 60° to about 80° F. with a sulfuric acid catalyst having a strength within the range from about 85% to about 92% $H_2SO_4$ to form a product containing a substantial amount of 1,2,4,5 tetra-isopropyl benzene and distilling said product to recover substantially purified 1,2,4,5 tetra-isopropyl benzene.

3. A method for producing a polyalkylated benzene which comprises forming a reaction mixture of propylene and an aromatic hydrocarbon selected from the group consisting of benzene and isopropyl benzene in a ratio of propylene to aromatic hydrocarbon in the range from about 2 to about 4 molar volumes per volume, contacting said mixture with a silica-alumina catalyst at a temperature within the range from about 300° to about 450° F. for a sufficient length of time to form a product containing a substanttial amount of 1,3,5 tri-isopropyl benzene, distilling said product to recover said tri-isopropyl benzene, forming a solution of said tri-isopropyl benzene in pentane, adding an alkylation amount of propylene at least 1 molar volume of propylene per molar volume of tri-isopropyl benzene to said solution, contacting the propylene-containing solution at a temperature within the range from about 60° to about 80° F. with a sulfuric acid catalyst having a strength within the range from about 85% to about 92% $H_2SO_4$ to form a product containing a substantial amount of 1,2,4,5 tetra-isopropyl benzene, distilling said product to recover substantially purified 1,2,4,5 tetra-isopropyl benzene and said pentane and unreacted tri-isopropyl benzene, and admixing at least a portion of the recovered pentane and unreacted tri-isopropyl benzene with said solution.

4. A method for producing a polyalkylated benzene which comprises forming a reaction mixture of propylene and an aromatic hydrocarbon selected from the group consisting of benzene and isopropyl benzene in a ratio of propylene to aromatic hydrocarbon in the range from about 2 to about 4 molar volumes per volume, contacting said mixture with a silica-alumina catalyst at a temperature within the range from about 300° to about 450° F. for a sufficient length of time to form a product containing a substantial amount of 1,3,5 tri-isopropyl benzene, distilling said product to recover said tri-isopropyl benzene, forming a solution of said tri-isopropyl benzene in a liquid saturated aliphatic hydrocarbon having a boiling point different from that of the tri-isopropyl benzene, adding an alkylation amount of propylene at least 1 molar volume of propylene per molar volume of tri-isopropyl benzene to said solution, contacting the propylene-containing solution at a temperature within the range from about 60° to about 80° F. with a sulfuric acid catalyst having a strength within the range from about 85% to about 92% $H_2SO_4$ to form a product containing a substantial amount of 1,2,4,5 tetra-isopropyl benzene, distilling said product to recover said tetra-isopropyl benzene, and then crystallizing said recovered tetra-isopropyl benzene to obtain 99% purity 1,2,4,5 tetra-isopropyl benzene.

5. A method for producing a polyalklated benzene which comprises forming a solution of 1,3,5 tri-isopropyl benzene in a liquid saturated aliphatic hydrocarbon having a boiling point different from that of the tri-isopropyl benzene, adding an alkylation amount of propylene at least 1 molar volume of propylene per molar volume of tri-isopropyl benzene to said solution, contacting the propylene-containing solution at a temperature within the range from about 60° to about 80° F. with a sulfuric acid catalyst having a strength within the range from about 85% to about 92% $H_2SO_4$ to form a product containing a substantial amount of 1,2,4,5 tetra-isopropyl benzene, and recovering substantially purified 1,2,4,5 tetra-isopropyl benzene from said product.

6. A method in accordance with claim 5 in which the saturated aliphatic hydrocarbon has 5 to 7 carbon atoms.

7. A method in accordance with claim 5 in which the saturated aliphatic hydrocarbon is pentane.

8. A method in accordance with claim 5 in which the product is recovered by distillation.

9. A method in accordance with claim 5 in which the product is recovered by distillation followed by crystallization.

References Cited in the file of this patent
UNITED STATES PATENTS 2,848,514     DeKeizer et al. _____ Aug. 19, 1958

FOREIGN PATENTS 323,100     Great Britain _____ Dec. 24, 1929
763,181     Great Britain _____ Dec. 12, 1956

OTHER REFERENCES

Newton: Jour. Amer. Chem. Soc., vol. 65, p. 320–323, 1943.

Nightingale: Chem. Rev. 25, 329–76 (1939), p. 341 relied on.

Ipatieff et al.: J. Am. Chem. Soc., 58, pp. 919–923 (1936).